UNITED STATES PATENT OFFICE.

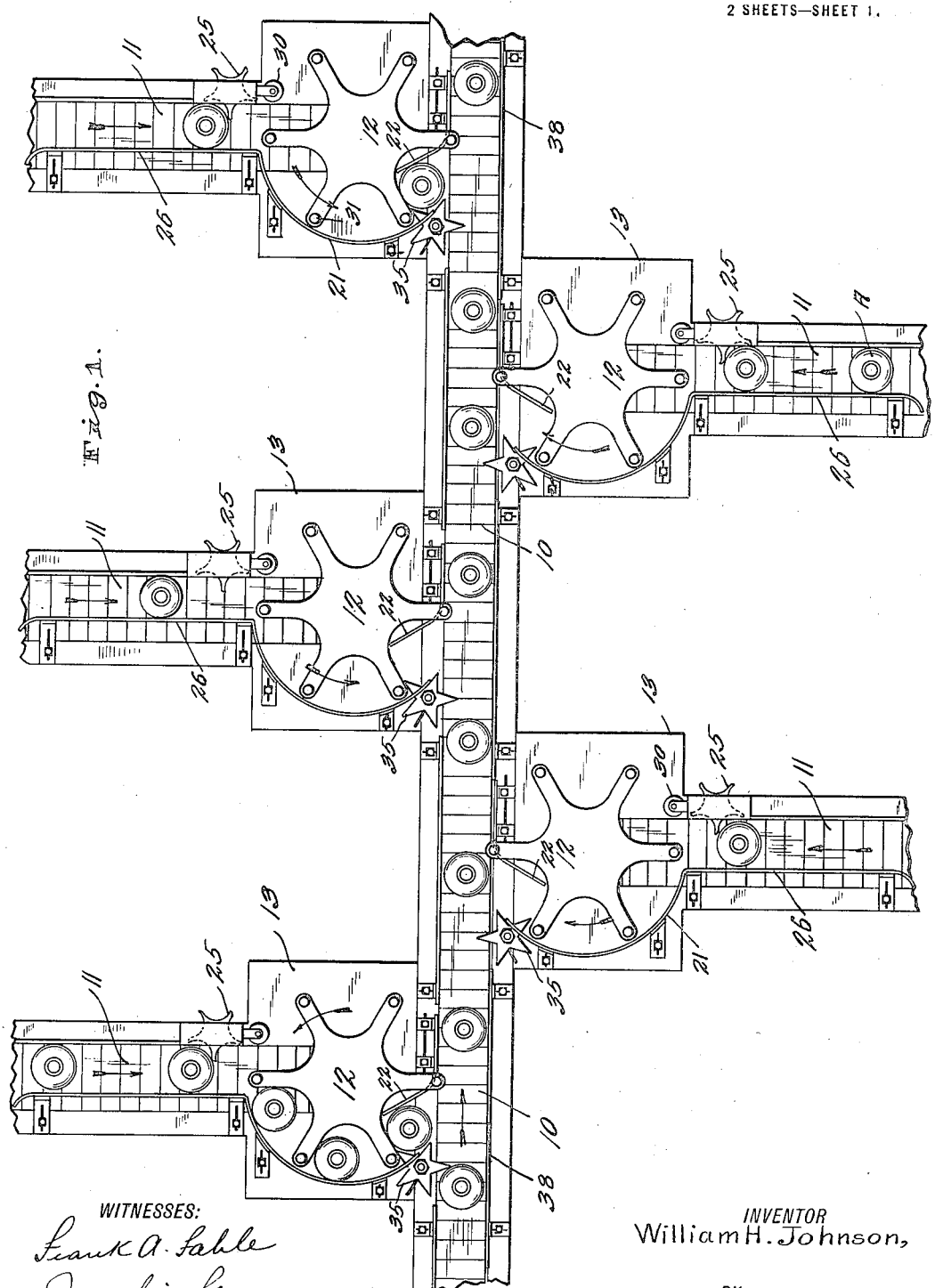

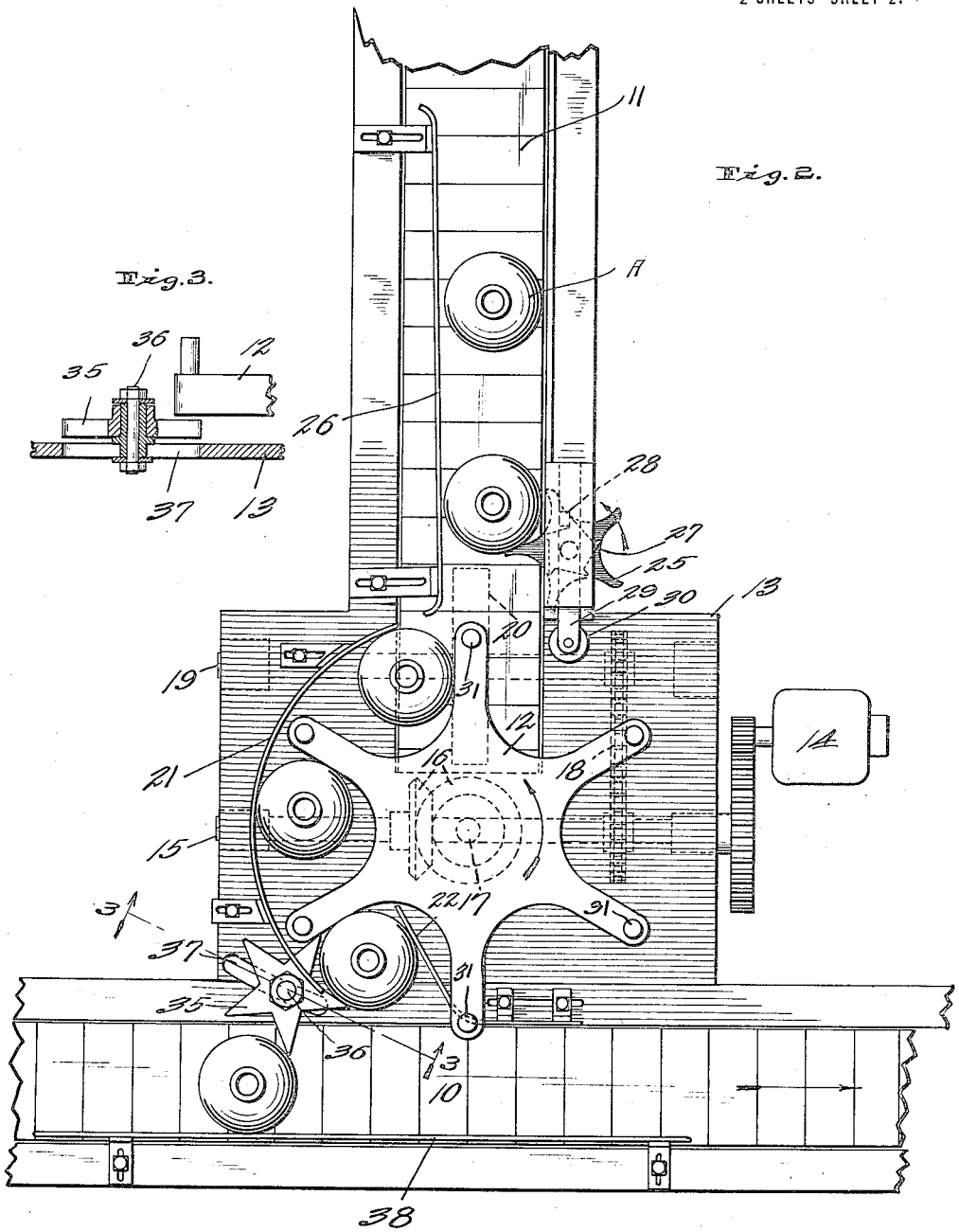

WILLIAM H. JOHNSON, OF TERRE HAUTE, INDIANA.

TRIBUTARY-FEEDER CONTROL.

1,281,579. Specification of Letters Patent. Patented Oct. 15, 1918.

Application filed January 18, 1917. Serial No. 142,981.

*To all whom it may concern:*

Be it known that I, WILLIAM H. JOHNSON, a citizen of the United States, residing at Terre Haute, in the county of Vigo and State of Indiana, have invented a new and useful Tributary-Feeder Control, of which the following is a specification.

In many plants articles are carried on conveyers, and sometimes it is desired that there be branch conveyers which feed to a main conveyer as tributaries. This happens in glass plants, or in breweries, where a number of bottle machines or filling machines discharge on to their separate conveyers all of which discharge on to a main conveyer. In many of these, it is essential that the bottle or other article which is discharged from a tributary conveyer on to the main conveyer shall not be interfered with by a similar bottle or other article already on the main conveyer, as a collision between two bottles or other articles might result in disaster, such as the breaking of the machine or of one or both articles, or, as when the conveyer is carrying hot bottles just formed by a bottle machine, the sticking together of the colliding bottles.

It is the object of my present invention to avoid the possibility of such collisions, between articles on a main conveyer and articles discharged thereupon from a tributary conveyer.

The accompanying drawings illustrate my invention. Figure 1 is a plan view of a main conveyer with several tributary conveyers feeding thereto, showing my invention embodied therein; Fig. 2 is a similar view on a larger scale of a fragment of the main conveyer and of one tributary conveyer, with my invention embodied therein; and Fig. 3 is a section on the line 3—3 of Fig. 2.

The main conveyer 10 is shown as of the endless chain type, and is driven in the direction of the arrow in any suitable manner. It is an impositive conveyer, carrying its load forward frictionally, so that such load can without damage slide rearward relative to the conveyer. Positively feeding this main conveyer 10 are a number of tributary conveyers 11, which may feed from either or both sides. These tributary conveyers, which are also impositive conveyers, carrying their articles frictionally receive their supply of articles, such as bottles A, from any suitable sources, such as bottle machines or bottle-filling machines. At the discharge end of each tributary conveyer 11, which is the end toward the main conveyer 10, there is a conveyer wheel or feeder star wheel 12 turning on a vertical axis over a table 13, by which feeder star wheel the positive feeding to the main conveyer is obtained. As shown, each tributary conveyer and its associated feeder star wheel are operated in common by a motor 14, which drives a shaft 15 connected by bevel gearing 16 to the vertical shaft 17 of the star wheel 12 and by a chain 18 and suitable sprockets to a shaft 19 carrying the driving sprocket 20 of the tributary conveyer chain 11. The feeder star wheel 12 receives the bottles or other articles from the associated tributary conveyer 11, slides them off such tributary conveyer and around on the table 13, within an arc-shaped guide rail 21, and dischages them positively from the table 13 obliquely on to the main conveyer 10 with a component of motion in the direction of travel of said main conveyer. An oblique guide rail 22 coöperates with fingers of the star wheel 12 to force the bottles or other articles positively on to the main conveyer in this oblique direction.

In order to control the passage of the bottles A into the notches of the feeder star wheel 12, I provide a governor star wheel 25 near the discharge end of each tributary conveyer 11 and overlapping thereupon from the opposite side thereof from the arc-shaped guide rail 21 and from an adjustable fence rail 26 which extends along the auxiliary conveyer 11 and serves to force the bottles A toward that side of the conveyer over which the governor star wheel 25 projects. This governor star wheel 25 is of the character of that shown in my Patent No. 1,118,425, granted November 24, 1914, and acts to hold back the bottles A on the tributary conveyer 11 save at such times as they will be received properly into the notches in the rotating feeder star wheel 12. For this purpose, the governor star wheel 25 is provided with a series of latch teeth 27 equal in number to the fingers of such governor star wheel, and with these latch teeth a latch finger 28 carried by a spring-pressed plunger 29 coöperates so that the governor star wheel 25 is held from turning in a position where one of its fingers projects over the tributary conveyer 11 to stop the passage of bottles A therealong. The plunger 29 is provided at its end with a roller 30, which is engaged by upstanding pins 31 on the successive fingers of the feeder star wheel 12 as the latter turns so as to move the latch finger 28 against its spring out of engagement with a tooth 27 to permit the retarded bottle to turn the governor star wheel 25 and be carried along by the tributary conveyer into one of the notches of the feeder star wheel. The governor star wheel is located at such a distance from the feeder star wheel that it accomplishes this properly.

In order to prevent the bottles traveling along the main conveyer 10 from interfering with those which are fed on to the main conveyer from a tributary conveyer by a feeder star wheel 12, I provide a control star wheel 35 for each feeder star wheel 12. This control star wheel 35 is mounted in the angle between the outer edge of the arc-shaped guide rail 21 at its discharge end and the main conveyer 10, so that the points of the star overlap both upon such main conveyer and upon the path of the bottles A along the inner face of such guide rail, as is clear from Fig. 2. The amount of such overlapping is adjustable, as by having the control star wheel 35 mounted on a vertical post 36 which is adjustable along a slot 37 in the table 13, this slot preferably substantially bisecting the angle between the arc-shaped guide rail 21 and the main conveyer 10 so that by the adjustment of the post 36 along such slot the projection of the fingers of the control star wheel 35 is adjusted both over the main conveyer 10 and over the path of the bottles along such arc-shaped guide rail. In order to force the bottles on the main conveyer into the notches of the control star wheel 35, an adjustable fence rail 38 is provided opposite such star wheel on the main conveyer frame. This fence rail 38 is adjusted toward or from the control star wheel 35 to accommodate smaller or larger bottles. In the same way the oblique guide rail 22 is adjustable lengthwise of the main conveyer 10, as indicated, to force into the notches of the control star wheel the bottles traveling along the inner face of the arc-shaped guide rail 21.

In operation, the bottles are fed to the main conveyer 10 from the various tributary conveyers 11, and the spacing of the bottles on the main conveyer is more or less irregular. Each tributary conveyer 11 discharges its bottles directly into its associated feeder star wheel 12, this discharge being governed by the governor star wheel 25 so that the bottles enter the notches of the feeder star wheel properly and are not broken between the points of the star wheel and the fence rail 26 as would otherwise at times be the case. The bottles are carried by the feeder star wheel 12 around the curved path determined by the arc-shaped guide rail 21, traveling against the inner face of such guide rail. When they reach the discharge end of this arc-shaped guide rail 21, they strike a projecting finger of the control star wheel 35 and turn such control star wheel in the proper direction—clockwise in Fig. 2—so that its finger which overlaps the main conveyer moves backward along the latter. If at this time there is a bottle traveling along the main conveyer 10 in position to engage the control star wheel finger overlapping the main conveyer, this bottle is pushed back slightly so that the bottle then operating the control star wheel 35 may have a free entrance on to the main conveyer 10, without possibility of collision with any bottles already on the main conveyer. The control star wheel 35 is adjusted along the slot 37 so as to produce the proper spacing for the attainment of this result. As the bottle from the tributary conveyer turns the control star wheel 35, it strikes the oblique guide rail 22, and is forced thereby and by the finger of the feeder star wheel 12 on to the main conveyer 10, which carries it along in the direction of the arrow to any desired point. As the bottles are carried by the main conveyer 10 purely by friction, but are positively moved by the fingers of the feeder star wheel, the bottles being fed by the feeder star wheel always predominate in their effect on the control star wheel over those being carried by the main conveyer 10, so that the action in retarding the bottles traveling on the main conveyer takes place as above described.

I claim as my invention:

1. In combination, an impositive main conveyer, a conveyer feeding positively to the main conveyer, and means controlled by the passage of articles along said second conveyer for obstructing the passage of articles along the main conveyer toward the junction.

2. In combination, an impositive main conveyer, a conveyer feeding positively to the main conveyer, and a control star wheel overlapping said main conveyer and turned by the passage of articles along the latter toward the junction point with said second conveyer, said control star wheel being controlled by the passage of articles from the second conveyer to the main conveyer for causing such control star wheel to obstruct the passage of articles along such main conveyer.

3. In combination, an impositive main conveyer, a conveyer feeding positively to the main conveyer, and a control star wheel overlapping the paths of articles to the junction point from both conveyers so as to obstruct an article approaching such junction point on the main conveyer when an article is approaching such junction point on the other conveyer, said control star wheel being adjustable toward and from said junction point.

4. In combination, an impositive main conveyer, a conveyer feeding positively to the main conveyer, and a control star wheel overlapping the paths of articles to the junction point from both conveyers so as to obstruct an article approaching such junction point on the main conveyer when an article is approaching such junction point on the other conveyer.

5. In combination, an impositive main conveyer, a feeder star wheel feeding positively to said main conveyer, and means controlled by the feeding of articles from said feeder star wheel to said main conveyer for controlling the passage of articles along the main conveyer toward the point to which said feeder star wheel feeds.

6. In combination, a main conveyer, a feeder star wheel feeding to said main conveyer, and a control star wheel overlapping upon said main conveyer and turned by the passage of articles along the latter toward the point to which said feeder star wheel feeds, said control star wheel being controlled by the feeding of articles by said feeder star wheel to the main conveyer for causing the control star wheel to obstruct the passage of articles along such main conveyer.

7. In combination, a main conveyer, a feeder star wheel feeding to said main conveyer, and a control star wheel overlapping the paths of articles both along the main conveyer and of articles fed by the feeder star wheel toward the point to which the feeder star wheel feeds, so as to obstruct articles approaching such point on the main conveyer when an article is being fed to the main conveyer by the feeder star wheel, said control star wheel being adjustable toward and from the point to which the feeder star wheel feeds.

8. In combination, a main conveyer, a feeder star wheel feeding to said main conveyer, and a control star wheel overlapping the paths of articles both along the main conveyer and of articles fed by the feeder star wheel toward the point to which the feeder star wheel feeds, so as to obstruct articles approaching such point on the main conveyer when an article is being fed to the main conveyer by the feeder star wheel.

9. In combination, an impositive main conveyer, an impositive tributary conveyer, a feeder star wheel receiving articles from the tributary conveyer and positively feeding them to the main conveyer, and means controlled by the feeding of articles by the feeder star wheel to the main conveyer for obstructing the passage of articles along the main conveyer.

10. In combination, an impositive main conveyer, an impositive tributary conveyer, a feeder star wheel receiving articles from the tributary conveyer and positively feeding them to the main conveyer, and a control star wheel overlapping upon said main conveyer and turned by the passage of articles along the latter toward the point to which said feeder star wheel feeds, said control star wheel being controlled by the feeding of articles by said feeder star wheel to the main conveyer for causing the control star wheel to obstruct the passage of articles along such main conveyer.

11. In combination, an impositive main conveyer, an impositive tributary conveyer, a feeder star wheel receiving articles from the tributary conveyer and positively feeding them to the main conveyer, and a control star wheel overlapping the paths of articles both along the main conveyer and by the feeder star wheel toward the point to which the feeder star wheel feeds, so as to obstruct articles approaching such point on the main conveyer when an article is being fed to the main conveyer by the feeder star wheel, said control star wheel being adjustable toward and from the point to which the feeder star wheel feeds.

12. In combination, an impositive main conveyer, an impositive tributary conveyer, a feeder star wheel receiving articles from the tributary conveyer and positively feeding them to the main conveyer, and a control star wheel overlapping the paths of articles both along the main conveyer and by the feeder star wheel toward the point to which the feeder star wheel feeds, so as to obstruct articles approaching such point on the main conveyer when an article is being fed to the main conveyer by the feeder star wheel.

13. In combination, an impositive main conveyer, a conveyer feeding positively to the main conveyer, and a stop member interposable in the path of articles along the main conveyer toward the junction and controlled by the passage of articles along the second conveyer.

14. In combination, an impositive main conveyer, a feeder star wheel feeding positively to said main conveyer, and a stop member interposable in the path of articles along the main conveyer toward the junction and controlled by the feeding of articles from said feeder star wheel to said main conveyer.

15. In combination, an impositive main conveyer, an impositive tributary conveyer, a feeder star wheel receiving articles from the tributary conveyer and positively feeding them to the main conveyer, and a stop member interposable in the path of articles along the main conveyer toward the junction and controlled by the feeding of articles from said feeder star wheel to said main conveyer.

16. In combination, a main endless chain conveyer, a tributary endless chain conveyer, said two conveyers carrying articles resting thereon by friction with the articles, a feeder star wheel receiving articles from the tributary conveyer and discharging them on to said main conveyer, said feeder star wheel moving said articles by positively pushing them, and means controlled by the feeding of articles from said feeder star wheel to the main conveyer for stopping the passage of articles along the main conveyer toward the junction at which the feeder star wheel feeds when said feeder star wheel is feeding an article on to the main conveyer.

17. In combination, a main endless chain conveyer, said conveyer carrying articles resting thereon by friction with the articles, a feeder star wheel discharging articles on to said main conveyer, said feeder star wheel moving said articles by positively pushing them, and means controlled by the feeding of articles from said feeder star wheel to the main conveyer for stopping the passage of articles along the main conveyer toward the junction at which the feeder star wheel feeds when said feeder star wheel is feeding an article on to the main conveyer.

In witness whereof, I have hereunto set my hand at Indianapolis, Indiana, this 11th day of January, A. D. one thousand nine hundred and seventeen.

WILLIAM H. JOHNSON.